March 25, 1952 J. W. YOUNG 2,590,142
FELTING MACHINE
Filed Feb. 11, 1950
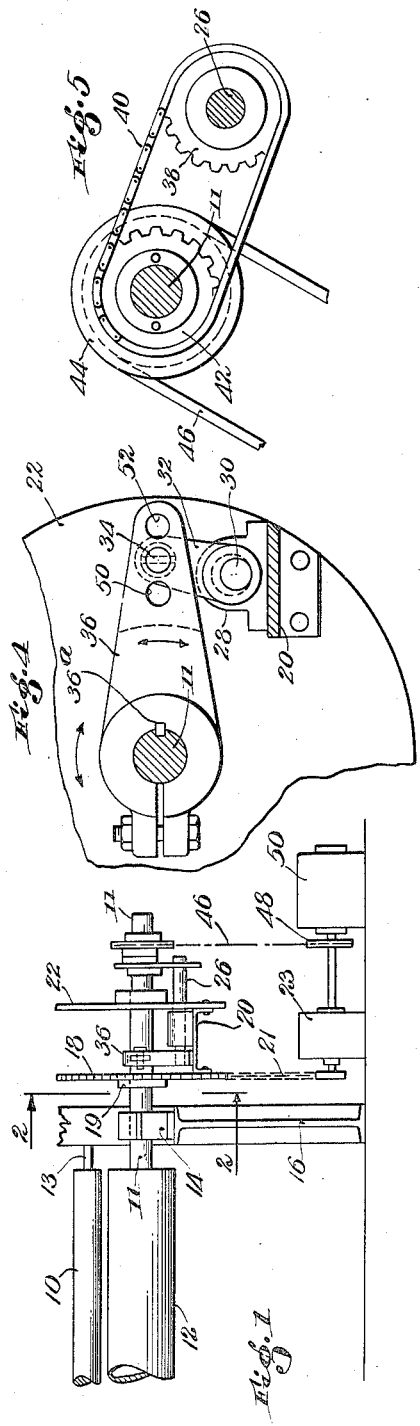
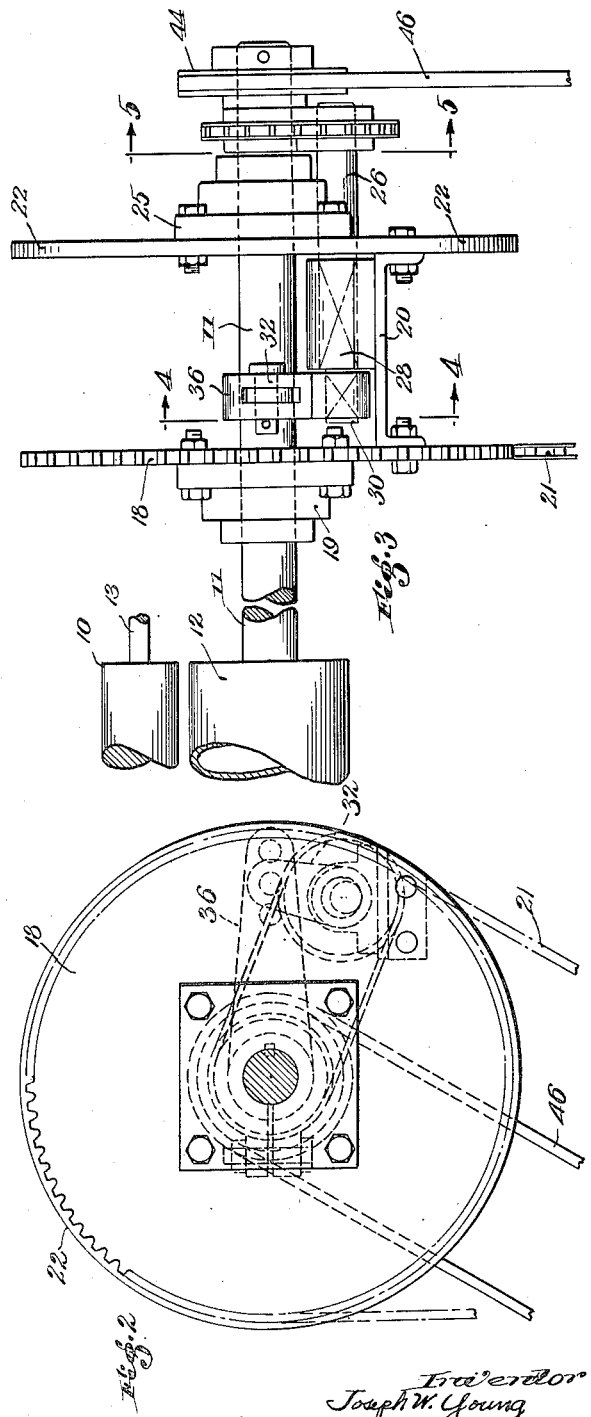
Inventor
Joseph W. Young Patented Mar. 25, 1952

2,590,142

UNITED STATES PATENT OFFICE 2,590,142

FELTING MACHINE

Joseph W. Young, Worcester, Mass., assignor to The Felters Company, Boston, Mass., a corporation of Massachusetts Application February 11, 1950, Serial No. 143,669

6 Claims. (Cl. 28—5)

This invention relates to improvements in machines and methods for making fibrous materials such as felted products and the like, in which a batt of carded fiber or partially hardened felt is passed between vibrating rolls to cause the fibers to become interlocked with one another in the presence of moisture and heat.

In the usual form of hardening or felting machines, the rollers are caused to vibrate laterally or axially and felting proceeds at a relatively slow rate, owing in part to definite bearing load limitations which restrict the frequency of vibration or oscillation at which the machine can be successfully operated.

It is an object of the invention, therefore, to improve machines and methods for making felted materials and to provide means for increasing the rate of speed at which roller type machines and similar devices may be vibratably operated in order to shorten the period of time required for the hardening and felting operation. It is also an object of the invention to devise a hardening and felting machine which is efficient to build and operate, which is relatively free from failure, and which can be maintained and repaired at relatively low cost.

These and other objects and novel features will be more fully understood and appreciated from the following description of a preferred embodiment of the invention selected for purposes of illustration and shown in the accompanying drawings, in which Fig. 1 is a fragmentary end elevational view of a roller hardening and felting machine, including the vibrating mechanism of the invention connected at one side thereof;

Fig. 2 is a cross-section taken on the line 2—2, of Fig. 1;

Fig. 3 is an enlarged fragmentary elevational view of the rollers and vibrating mechanism more clearly showing the driving means employed therein;

Fig. 4 is a cross-section taken on the line 4—4 of Fig. 3; and

Fig. 5 is a cross-section taken on the line 5—5 of Fig. 3.

In the structure shown in the accompanying drawings, numerals 10 and 12 denote upper and lower rolls of the type commonly employed in hardening and felting machines and which are intended to be representative of a plurality of such members arranged in parallel spaced-apart relation. Between the upper and lower rollers, a batt of fibrous material or a semi-hardened felt may be received and passed along with suitable provision being made for subjecting the product to heat and moisture in order to cause the fibers of the material to become thoroughly interlocked with one another and cause felting. Means for supplying heat and moisture are well known in the art and form no part of the present invention and accordingly, therefore, are not shown in the drawings.

The rollers 10 and 12 are fast on respective shafts 13 and 11 the latter of which is supported in a raised position in roller bearings 14 mounted on vertical frame pieces 16 indicated fragmentarily in Fig. 1. Shaft 11 is formed with an extended end portion which projects beyond the bearing 14 as noted in Figs. 1 and 3.

Mounted to rotate freely on shaft 11 is a revolving drive apparatus which includes a sprocket 18 solidly bolted to a bearing 19 and designed to be driven by a roller chain 21 from a gear reducer 23, in turn driven by a motor 50. The sprocket 18 has secured thereto at points between its center and peripheral edge an angle bracket 20 which extends outwardly in parallel spaced relation to shaft 11 to receive at its opposite extremity in solidly bolted relation a supporting plate 22. The latter member is also mounted on shaft 11, being bolted to bearing member 25, and is free to rotate so that the entire unit of sprocket wheel, angle bracket and plate are adapted to be driven by the reducer 23 and to revolve about the shaft 11 under some conditions.

Transversely disposed through the supporting plate 22 is an eccentric shaft 26 which extends through a long bearing 28 located between the sprocket 21 and the plate 22. At its inner extremity the eccentric shaft 26 is provided with an eccentric 30 which is pivotally secured to a link 32, in turn secured by a pin 34 to an eccentric arm 36. The latter arm is transversely secured to the shaft 11 by means of a key 36a as may be more clearly seen in Fig. 4.

The opposite end of eccentric shaft 26 has fixed thereon a sprocket wheel 38 driven by a sprocket chain 40, which is in turn driven by a second sprocket wheel 42 mounted on shaft 11 as suggested for example in Figs. 3 and 5. The sprocket member 42, is free to turn on shaft 11 and is, in addition, pinned at its hub portion to a drive pulley member 44. A belt 46 is driven by the second pulley 48, in turn actuated by a motor 50. The pulley 44 is also free to turn on the shaft 11 with the sprocket 42.

With the arrangement described, the felting roll mounted on shaft 11 rotates in unison with this member and can be driven at a relatively slow rotative speed through the reducer 23. Superimposed upon that rotative motion is an oscillating motion imparted to the roll and generated primarily by the eccentric 30. This oscillating motion is of small amplitude and the power for it is derived from the motor 50 which causes the eccentric to actuate the eccentric arm in all positions of the revolving drive apparatus about the shaft 11. The eccentric arrangement thus consists of vibrating mechanism which has the function of vibrating the roll circumferentially about this axis at a relatively high frequency of oscillation while the revolving drive means cooperates therewith to cause the roller 12 to turn at a relatively slow rotative speed.

The circumferential vibration functions to increase the speed of the felting action and to accelerate the rate at which the fibers of felt passing between the rolls 10 and 12 may become interlocked with one another.

The amplitude of vibration of the eccentric vibrating mechanism may be increased or decreased by removing the pivot pin 34 from the hole in which it is shown in the arm 36 and shifting it into one of the two additional holes 50 and 52.

An important feature of the arrangement described is the relatively high vibrating speed which may be achieved. It is pointed out that in developing the circumferential vibration of a roll about its axis, there is generated a torsional load in roll bearings which is substantially less than a bearing load on the same type of roller developed by oscillating the roller axially or laterally of itself, as is the conventional practice. With the smaller bearing load thus realized by this invention by reason of torsional stress, appreciably greater speeds can be developed, a better felting action can be achieved, and other advantages realized.

The method and apparatus described above is capable of considerable variation in its form and application. For example, I may desire to introduce a batt of fibrous material or partially hardened felt between rolls of the character described and a series of alternately disposed rolls arranged to provide a sinuous path along which the web may proceed. Or, I may desire to combine a single roll which is circumferentially vibratable with a bank of rolls arranged with their peripheries lying in the arc of a circle extending around the vibratable roll, and various other arrangements suggest themselves. Similarly, I may desire to resort to modifications of the specific vibrating mechanism for the roll or rolls within the scope of the appended claims.

Having thus described my invention, what I desire to claim and secure by Letters Patent is:

1. In a hardening and felting machine for felt-making, a main shaft having an oscillatable roll fixed thereon, revolving drive means including a gear, a supporting member rotatably mounted on the shaft in spaced relation to the gear, and a connecting element solidly secured between the gear and the supporting member, vibrating mechanism carried in the supporting member and including an arm keyed to the main shaft, an eccentric shaft having an eccentric pivotally attached to the arm, and independently driven means for actuating the eccentric shaft in any position of rotation about the main shaft.

2. In a roller hardening machine for felt, a main shaft having an oscillatable roll fixed thereon, revolving drive means free on the shaft, vibrating mechanism connected to the revolving drive means, the vibrating mechanism including an eccentric shaft, an eccentric located at one end thereof, and an arm which is keyed to the main shaft and which operates to vibrate the roll circumferentially about its axis in response to movement of the eccentric, independently driven means for actuating the eccentric shaft consisting of gear means free on the main shaft, the revolving drive means including a supporting member rotatably mounted on the main shaft in spaced relation to the said gear means, an outer end of the eccentric shaft being received through the supporting member, a second gear member fast on the eccentric shaft and driven by the said first gear means, and said revolving drive means cooperating with the vibrating mechanism to impart relatively slow rotative movement to the oscillatable roll as it vibrates.

3. In a roller hardening machine for felt, a main shaft having an oscillatable roll fixed thereon, a disc free on the shaft, a sprocket rotatably mounted on the shaft and connected to the disc by a bracket, driving means for the sprocket, an arm keyed to the shaft, an eccentric shaft having an eccentric linked to the arm, the eccentric shaft being received through the disc, and driving means for rotating the eccentric shaft as it revolves about the main shaft.

4. In a felting machine, a main shaft having an oscillatable roll fixed thereon, revolving drive means free on the shaft, vibrating mechanism connected to the revolving drive means and keyed to the shaft, independently driven means for actuating the vibrating mechanism and causing the oscillatable roll to vibrate circumferentially about its axis, the revolving drive means cooperating with the vibrating mechanism to impart relatively slow rotative movement to the oscillatable roll as it vibrates, and said vibrating mechanism including an eccentrically driven arm keyed to the shaft.

5. In a felting machine, a main shaft having an oscillatable roll fixed thereon, revolving drive means free on the shaft, vibrating mechanism connected to the revolving drive means and keyed to the shaft, independently driven means for actuating the vibrating mechanism and causing the oscillatable roll to vibrate circumferentially about its axis, the revolving drive means cooperating with the vibrating mechanism to impart relatively slow rotative movement to the oscillatable roll as it vibrates, said independently driven means including a sprocket member and a pulley rotatably mounted on the shaft and fixed to one another.

6. In a felting machine, a main shaft having an oscillatable roll fixed thereon, revolving drive means free on the shaft, vibrating mechanism connected to the revolving drive means and keyed to the shaft, independently driven means for actuating the vibrating mechanism and causing the oscillatable roll to vibrate circumferentially about its axis, the revolving drive means cooperating with the vibrating mechanism to impart relatively slow rotative movement to the oscillatable roll as it vibrates, and the independently driven means including a freely rotating sprocket and pulley on the shaft, the revolving driving means comprising a supporting plate located on the shaft in spaced relation to the sprocket, an eccentric shaft transversely disposed through the plate and a second sprocket member fixed at the outer end of the eccentric shaft in position to transmit motion from the freely rotating sprocket and pulley.

JOSEPH W. YOUNG.

REFERENCES CITED

The following references are of record in the file of this patent:

UNITED STATES PATENTS

| Number | Name | Date |
|---|---|---|
| 2,093,709 | Casse | Sept. 21, 1937 |
| 2,457,784 | Slayter | Dec. 28, 1948 |
| 2,506,855 | Casse | May 9, 1950 |